United States Patent [19]

Guerra

[11] 4,269,170
[45] May 26, 1981

[54] ADSORPTION SOLAR HEATING AND STORAGE SYSTEM

[76] Inventor: John M. Guerra, 56 Matchett St., Brighton, Mass. 02135

[21] Appl. No.: 900,703

[22] Filed: Apr. 27, 1978

[51] Int. Cl.³ .............................................. F24J 3/02
[52] U.S. Cl. .................................... 126/428; 126/430; 126/436; 126/449
[58] Field of Search ............... 126/270, 271, 400, 436, 126/449, 429, 430, 452, 428; 165/18, 48, 104 S, 104 M; 62/2, 48

[56] References Cited

U.S. PATENT DOCUMENTS

| | | | |
|---|---|---|---|
| 2,882,244 | 4/1959 | Milton | 62/48 X |
| 3,369,541 | 2/1968 | Thomason | 126/271 X |
| 4,034,569 | 7/1977 | Tchernev | 62/2 |
| 4,111,189 | 9/1978 | Dizon | 126/270 X |
| 4,165,952 | 8/1979 | Bennett | 62/2 |

OTHER PUBLICATIONS

A New Dictionary of Chemistry, Miall et al. Editors, Longman Group Ltd., London, 1968, pp. 634, 635.

*Primary Examiner*—James C. Yeung
*Assistant Examiner*—Larry Jones

[57] ABSTRACT

A typical solar energy flat plate collector whose volume is filled with a zeolite such as Linde Co.'s type 13X or LMS type 4A. The zeolite bed provides a means of chemical storage of solar energy for sunless periods through its potential "heat of adsorption". During sunless hours, stored energy in the form of latent heat of adsorption is released by allowing amounts of the adsorbate, water in this case, to be adsorbed by the zeolite bed. The zeolite bed is purged of this adsorbate during the sunny hours through the stagnation heat inside the solar collector and also by the purgative airflow through the bed, caused by a circulative system containing a radiator, a blower fan, a water atomizer and injector, and a water condenser that is passive through heat-sinking to the ground below the building to be heated. Another mode for this system is described wherein the air in the building is circulated through the zeolite bed so that hydrocarbon pollutants are adsorbed and the air purified.

1 Claim, 2 Drawing Figures

ADSORPTION SOLAR HEATING AND STORAGE SYSTEM

This invention relates to solar energy systems employing radiant energy collector plates and is concerned more particularly with a new means of energy storage from such systems through utilization of zeolites.

One of the most formidable problems of solar energy devices to be overcome is the efficient storage of the heat collected from such systems for use during the night and on sunless days. Several storage schemes have been advanced, some of which are: insulated water storage tanks, insulated rock piles, or insulated storage tanks filled with some type of antifreeze. Each of these storage schemes has some disadvantage, such as expense, size of volume needed, efficiency of extracting the stored energy, and decay of the stored energy with time due to heat losses. In accordance with the present teachings, however, the above problems are eliminated through the utilization of a zeolitic process. As a background for insuring a sufficient understanding of the present invention as claimed, zeolites are a family of chemical compounds that are capable of reversible adsorption. Typically, heat is released during the adsorption process (heat of adsorption); the adsorbate is released by applying heat to the zeolite adsorbent while purging the zeolite with a dry gas. Lifetimes of synthetic zeolites are on the order of 2000 cycles of adsorption/release. A representative text applicable to this subject is: *Molecular Sieves;* Charles K. Hersh; Reinhold Publishing Corp., New York; 1961. Also, reference to U.S. Pat. Nos. 2,306,610; 2,882,243; and 2,882,244 is recommended.

By way of preferred teaching, the zeolite used is a synthetic type marketed by the Linde Co. under the name "13X". It has an alumina-silicate base with sodium cation. The primary adsorbate for 13X is water. The 13X adsorbent will be described in the form of ⅛ in. pellets by preferred design, though it will be clear that the process will work to varying degrees of success in powder form, bead form, or other size pellets. Also, other zeolites, both natural and synthetic, will work to varying degrees of success with their respective adsorbates; for example, Linde Co.'s "LMS type 4A" with water as the adsorbate, or activated chabazite (natural) with water. Because this teaching relates specifically to the use of zeolites as energy storage for thermal flat plate solar collectors, and is not concerned with a new type of such collectors, the collector described will be of the most basic type so as to exemplify the preferred use of the zeolite storage process.

A thermal flat plate solar collector consisting of a flat rectangular box whose top is double pane glass, plexiglas, or some other transparent material, and whose base is flat black or dark green, is filled with 13X zeolite in the form of ⅛ in. pellets so as to form a layer of zeolite about an inch in depth or less. An inlet manifold is connected to an air blower to which is attached a water atomizer/injector. The use of a multiple duct manifold causes a more uniform distribution of air flow through the entire zeolite bed. The outlet manifold is connected via insulated ductwork or pipe to a heat exchanger(s) (any radiator currently used in forced hot air systems) inside the building to be heated. The radiator(s) is in turn connected to a condenser and then the blower to complete the circuit. During a sunny day, the panel collects the sun's radiant energy and converts it to heat in the process commonly known to this art. Thus the air in the panel is warmed and in turn warms the zeolite bed. The zeolite is also warmed by its own absorption of the solar energy. The continuous heating by the sun in concert with the relatively dry air blown through the collector by the blower causes the 13X to release the water adsorbate. The final water content of the zeolite is determined by its temperature, the relative humidity of the purgative air, the speed of the air flow, the time duration of this drying process, and the pellet size of the 13X. The heated air from the collector circulates down through the radiator(s), releasing heat to the building as any conventional forced hot fluid system does. The resultant cooled water-laden air passes from the radiator(s), where most of the water condenses out into a ground-cooled reservoir for later use by the water spray injector. Hence, during this phase of the cycle, solar energy is stored in the form of heat of adsorption in the 13x zeolite bed. As long as the circulating air is kept free of water adsorbate, the solar energy can be stored indefinitely. At night, or on cloudy days, this stored energy is released by injecting atomized water into the blower. This water circulates through the zeolite bed in the collector and is adsorbed, releasing the heat of adsorption and warming the circulating air. This warm air then flows through the radiator(s) to warm the building in the same manner as above. The heat extracted from the zeolite bed in the panel is regulated by the amount of water injected into the airflow and the rate at which it is injected. This can be controlled automatically by a thermostatically controlled hydraulic valve. The entire adsorption/release cycle described above is repeatable up to 2000 times., indicating a lifetime of over 6 years for the zeolite. The size of the collector and zeolite bed required is of course dependent on the heat requirement of the building.

The blower fan should be reversible, as the system is more efficiently purged on the water adsorbate if the purgative air flow is opposite in direction to the water injected airflow during the sunless hours. Thus the regeneration of the zeolite bed will be more complete.

A bonus feature of the zeolite storage system, especially when 13X is the zeolite, is its affinity for hydrocarbons. If instead of the closed-loop forced hot air system described above an open loop system is used, i.e. the radiator is a simple blower vent, and the inlet blower/water injector takes air directly from the building's interior, then the hydrocarbon affinity of the zeolite bed would serve to purify the interior air of hydrocarbon pollutants.

The advantages of this zeolitic storage system are many. The solar energy is stored with high chemical efficiency as long as the zeolite bed is kept dry. The stored chemical energy can be released as heat in an easily controllable manner with the common, non-toxic, non-flammable, non-polluting, inexpensive adsorbate, water. The zeolite bed is easily integrated with current designs of solar thermal collectors, precluding the need for large insulted thermal storage tanks, etc. The 13X zeolite itself is common and economical in large purchases, especially considering its 2000 plus cycle lifetime.

It is an object, therefore, of the present invention to provide a chemical storage of energy from solar thermal collectors by means of dehydrating a zeolite bed with solar heat and purgative airflow.

Another object is to provide an energy storage system for solar thermal collectors that is mutually compatible and beneficial to a forced hot air heating system.

Another object is to provide a chemical energy storage system for solar energy that is easily integrable with solar thermal flat plate collectors.

A further object is to provide an energy storage system for solar thermal flat plate collectors that is efficient over long periods of sunless days (i.e., allows very little energy loss).

Still another object is to provide an energy storage system for solar thermal flat plate collectors that allows easily contollable and efficient release of energy from storage for heating.

Yet another object is to provide an energy storage system for solar thermal flat plate collectors that is economically attractive for the individual home-owner in comparison to current and projected costs for home-heating by conventional means.

A final object is to provide an energy storage system for solar thermal flat plate collectors that also provides air purification by means of adsorbing hydrocarbon pollutants from the building's interior air.

Other objects, advantages, and novel features of the invention will become apparent from the following detailed description of the invention when considered in conjunction with the accompanying drawings, wherein.

Figure 1:
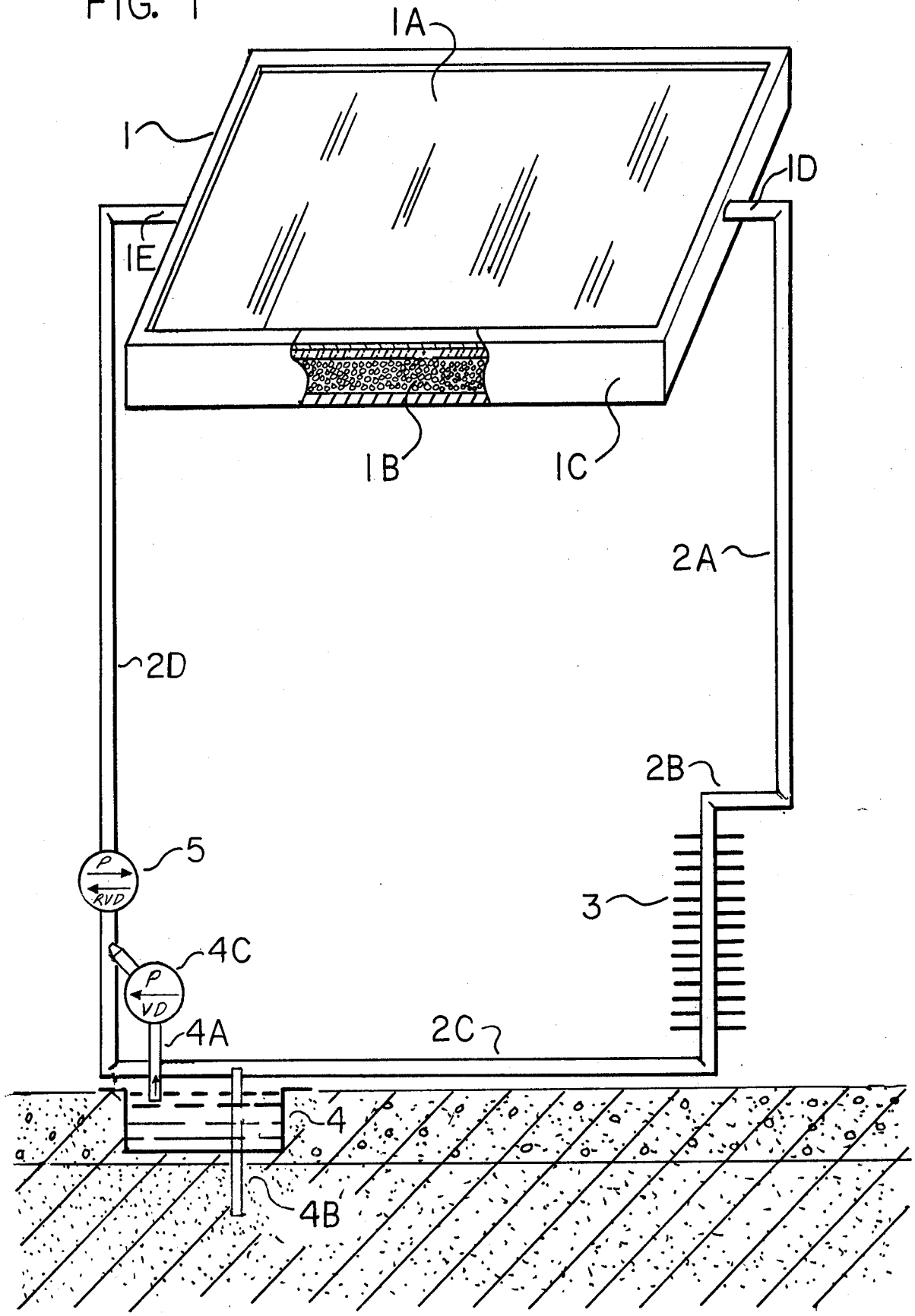
FIG. 1 represents the entire zeolitic storage system, with the solar thermal flat plate collector in pictorial view and a cross section shown to reveal the zeolitic bed; the remainder of the closed-loop heating circuit shown in schematic form.
Figure 2:
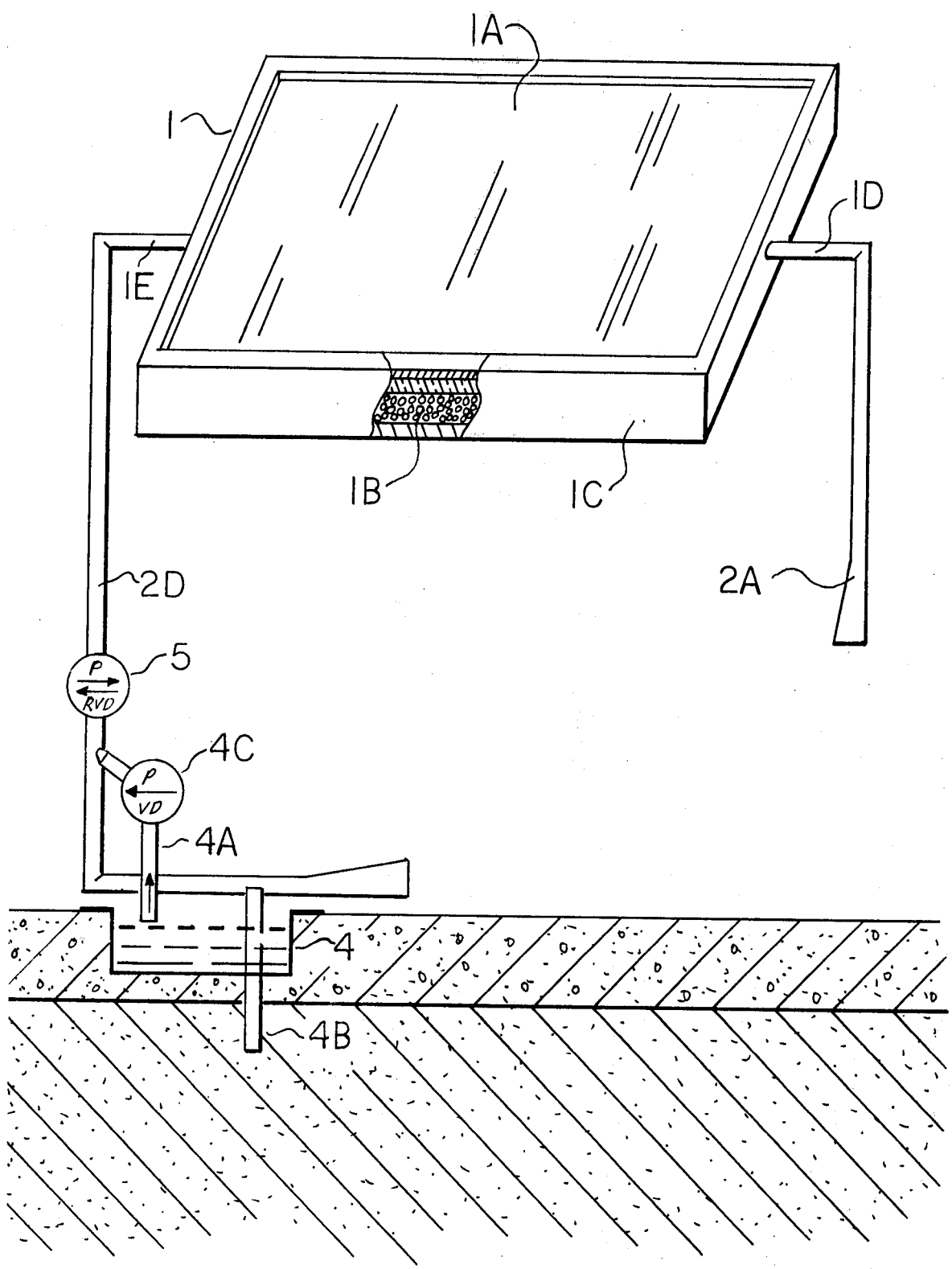
FIG. 2 represents the entire zeolitic storage system as in FIG. 1 but in the air purification mode; again, the solar collector is shown in pictorial and the heating circuit is shown in schematic form.

Referring to FIG. 1, item 1 shows a typical solar energy thermal flat plate collector. Item 1A is a glass, plexiglas, or other transparent material in sheet form. Together with box 1C, they form a volume whose width and length are much greater than its height. Box 1C can be constructed typically of treated wood, corrugated aluminum, plastic, or other material known to the art of solar collectors. All interior surfaces of the box are flat black or flat dark green to maximize absorbant efficiency of the solar collector to the solar radiation. The volume enclosed by this box is filled with the 13X zeolite (item 1B) by preferred practise, though LMS type 4A or other zeolite with water as its primary adsorbate could be used instead. The entire solar collector 1 is aimed at the solar ecliptic, and may be mounted on the roof of a building, as shown in FIG. 1, or inside a solarium structure integral to the building, as represented in FIG. 2. The advantages of mounting the solar collector inside such a solarium are several: first, maintenance is much easier to accomplish; second, the solar collector serves also as radiator by exchanging its absorbed solar energy directly with the building's interior, eliminating some extra radiators and decreasing heat loss from transport through ducts from the roof; and third, the economics are better than for the roof-mounted version.

The outlet manifold 2A in FIG. 1, consisting of insulated branched pipe, carries the heat-laden air from the interior of the solar collector to the radiator 3 inside the house. Heat is exchanged from the piped hot air to the house interior through the radiator as with conventional forced hot fluid systems.

The solar energy collected by the solar collector is functional in two ways: first, the air circulated through the collector volume is heated, thus allowing heating of the house in the manner just described and; second, the heat within the collector, in conjunction with the dry airflow through the collector caused by blower (item 5 in FIG. 1), purges the zeolite 13X bed of much of its adsorbed water and is thus chemically stored in the potential heat of adsorption of the 13X. The efficiency of this storage process depends on the temperature of the zeolite bed, the humidity of the purgative airflow, and the speed of the purgative airflow.

Now, the air emerging from the radiator 3 is cooler and of high humidity because of the purging of the water adsorbate from the zeolite bed. When this air flows through insulated pipe 2C, it makes contact with a protruding metal rod that is cooled by way of heat-sinking to the ground below the building. The water vapor in the air condenses for the most part onto this cool metal rod (item 4B in FIG. 1) and flows into the reservoir 4. The air, now fairly dry, enters blower fan 5 and is pushed up insulated pipe 2D to enter the inlet manifold 1E, which like the outlet manifold 1D, is an insulated branched pipe. A manifold such as this serves to distribute the airflow uniformly throughout the zeolite bed and so prevents build-up of adsorbate along restricted paths through the zeolite bed. And so the entire heating/purging cycle is repeated.

Now ,during the sunless hours (night-time and cloudy days), the dry zeolite bed in the solar collector is a source of stored chemical energy which is readily changed into thermal energy by allowing water into the system's airflow. Item 4C is a water atomizer and injector that, at the control of a thermostat or otherwise, sprays fine droplets of water into the airflow. The water is taken from the reservoir 4 by way of pipe 4A in FIG. 1. Blower 5 forces the water laden air into the dry zeolite bed contained in the solar collector, where some of the water is adsorbed, resulting in released heat of adsorption. For the 13X zeolite, the heat released is about 1800 BTU's per pound of water adsorbed. Thus the air flowing through the collector is heated, and in turn heats the building as it flows through the radiator 3. The supply of heat only terminates when the zeolite bed is completely water-loaded and cannot adsorb any more water.

In actual practise, maximum cycle lifetime for the zeolite can be achieved by circulating the airflow in the opposite direction for the purging cycle than for the adsorption cycle. This requires blower 5 to be reversible.

Another advantage of this invention lies in the fact that the 13X zeolite also adsorbs hydrocarbons, and so can purify the building's air of hydrocarbon pollutants. FIG. 2 illustrates the above zeolitic storage system in the air-purification mode. With the part of pipe section 2C removed between radiator and reservoir 4, air from the building's interior is circulated through the zeolite bed in the solar collector, warmed as in the above specification, and also purified of hydrocarbons, then is blown back into the house through pipe 2A as purified warm air. Radiator 3 is omitted in this mode.

By way of further specification, the following is a sample calculation of the amount of zeolite needed for heat storage for a family of four living in the Boston area. Such a family requires about 20,000 BTU's per day for space heating of a small house with four or five rooms. As stated previously, type 13X zeolite releases about 1800 BTU's per pound of water adsorbed, and about 5 lbs. of 13X zeolite are required to adsorb a pound of water. Hence approximately 56 lbs. of 13X are necessary to store 20,000 BTU's, an average day's heat requirement for this family. To allow for a cloudy spell of a few days or an extremely cold winter, a factor of 4 times this figure, or about 224 lbs. of 13X, is reasonable. At $5.00/lb. of 13X, this results in an initial cash outlay for this family of $1120, less than the cost of an equivalent tank storage facility of the above BTU capacity. The 13X pellets have a density of about 39 lbs./cu. ft., so 224 lbs. would require a volume of 5.74 cu. ft., or an area of 69 sq. ft. at a bed depth of 1". Hence a panel solar collector of 7 ft.×10 ft.×1" would satisfy the storage volume requirement.

It will be evident to those skilled in the art that the illustrated embodiments of this zeolitic storage system for solar thermal energy may be altered for certain purposes; in particular, the type of zeolite used is variable. Accordingly, it should be understood that the specific constructional details here illustrated and described are presented for purpose of disclosure rather than as limitations, and that in the appended claims it is aimed to cover all such modifications and equivalencies as fall within the true spirit and scope of the invention.

What I claim as new and desire to secure by Letters Patent of the United States is:

1. A solar thermal energy storage and collector system comprising, a collector housing having a gas inlet and outlet, said housing having therein a bed of zeolite material positioned to absorb heat produced by incident solar energy; a heat exchanger, means for circulating a gas through the heat exchanger, the housing inlet, the zeolite material 1D and back to the heat exchanger in a closed gaseous flow path, means for injecting atomized water into and condensing water vapor out of the circulating gas in a mutually exclusive operation, said injecting and condensing means positioned in the flow path between the heat exchanger and the housing inlet, whereby the zeolite material releases the latent heat of adsorption to the gas upon exposure of the material to the water adsorbate containing gas, and whereby the zeolite material is purged of the adsorbed water by the combined action of the incident solar energy, the circulating gas, and condensing means, thus completing the solar heating and storage cycle.

* * * * *